United States Patent
Luan et al.

(10) Patent No.: US 7,941,774 B2
(45) Date of Patent: May 10, 2011

(54) PARTIAL TIMING MODELING FOR GATE LEVEL SIMULATION

(75) Inventors: Hao Luan, Plano, TX (US); Steve P. Korson, Murphy, TX (US)

(73) Assignee: Texas Instruments Incorporated, Dallas, TX (US)

( * ) Notice: Subject to any disclaimer, the term of this patent is extended or adjusted under 35 U.S.C. 154(b) by 362 days.

(21) Appl. No.: 12/185,453

(22) Filed: Aug. 4, 2008

(65) Prior Publication Data

US 2010/0031209 A1    Feb. 4, 2010

(51) Int. Cl.
     *G06F 17/50*      (2006.01)
(52) U.S. Cl. ............................ 716/113; 716/108; 703/16
(58) Field of Classification Search .................. 716/6, 2, 716/7, 18, 108, 113; 703/16
See application file for complete search history.

(56) References Cited

U.S. PATENT DOCUMENTS

| | | | |
|---|---|---|---|
| 6,470,482 B1 * | 10/2002 | Rostoker et al. ............ | 716/6 |
| 2007/0124717 A1 * | 5/2007 | Deur et al. ................. | 716/18 |
| 2007/0168893 A1 * | 7/2007 | Watanabe et al. ........... | 716/3 |

OTHER PUBLICATIONS

Cheon et al., "Stable Multiway Circuit Partitioning for ECO", International Conference on Computer-Aided Design, Nov. 9-13, 2003, pp. 718-725.*

* cited by examiner

*Primary Examiner* — Phallaka Kik
(74) *Attorney, Agent, or Firm* — Dawn V. Stephens; Wade James Brady, III; Frederick J. Telecky, Jr.

(57) ABSTRACT

Various apparatuses, methods and systems for creating an integrated circuit and performing a gate level simulation of a circuit are disclosed herein. For example, some embodiments of the present invention provide a system for performing a gate level simulation of a circuit including a computer system, a design verification tool and an output device. The design verification tool, executable on the computer system, includes a simulator and a partial timing model generator. The partial timing model generator is operable to generate a representation of the circuit for simulation by cutting a first portion of a circuit out of a full gate level netlist for the circuit and leaving a second portion of the circuit represented by the full gate level netlist, and to overlay a simplified representation of the first portion of the circuit over the representation of the circuit. The first portion of the circuit is cut out at timing paths. The simulator is operable to perform a gate level simulation of the circuit based on the representation of the circuit. The output device is connected to the computer system and is operable to provide an indication of a result of the gate level simulation of the circuit.

20 Claims, 5 Drawing Sheets

PARTIAL TIMING MODELING FOR GATE LEVEL SIMULATION

BACKGROUND OF THE INVENTION

The present invention is related to simulation of circuit designs, and more particularly to partial gate level simulations of a circuit design.

Electronic circuits are used in an enormously wide and important range of applications, such as computing, communications, control systems, etc. Common electronic circuits may include millions of transistors and are very difficult to design. Circuits are typically designed on computer systems using electronic design automation (EDA) software, combining logic gates and other circuit elements as needed to perform the desired function. Once a circuit has been designed, it typically undergoes a series of design verification steps such as a static timing analysis and gate level simulation before it is fabricated as a custom integrated circuit, an application-specific integrated circuit (ASIC), a field-programmable gate array (FPGA), etc. Computerized design verification tools are used to simulate the circuit, exercising the clock and data inputs of a virtual representation of the circuit design and verifying that the circuit design performs correctly both at the outputs of the circuit and at selected internal nodes. Because of the enormous complexity of modern electronic circuits, the design verification step is often the most difficult and lengthy step in designing a circuit. Performing a full gate level simulation of a complex electronic circuit can require weeks to perform even on high performance computers, because each of the numerous logic gates in the circuit are tested in the simulation in various functional states.

The difficulty of designing complex electronic circuits is partially addressed by reusable circuit libraries called semiconductor intellectual property cores or IP cores, which contain reusable logic blocks that are designed to perform given functions and that can be included in a circuit design. Blocks from an IP core may be dropped into a circuit design to perform a desired function, rather than redesigning the circuitry to perform the function each time it is needed. IP cores are particularly important when designing a system on a chip (SOC), an electronic circuit such as a computer that performs multiple functions. For example, a computer may be designed as an SOC, using blocks from an IP core to provide a processor, memory, clock sources, external interfaces, power regulation, etc. IP cores may be supplied as generic gate netlists, a low level representation of the logic design, or as a synthesizable core having a higher abstraction level such as a hardware description language. Performing a gate level simulation of the circuit, including the blocks from the IP core, can take a great deal of computer processing time. The supplier of the IP core typically tests the design of the IP core, so the designer using the IP core may have the option of performing a gate level simulation only on circuitry outside the blocks from the IP core and forgoing gate level simulation of the blocks from the IP core. However, if a gate level simulation omits the blocks from the IP core, design flaws may go undetected because the interface between the blocks from the IP core and the remaining circuitry is not fully tested. The time required to perform a full gate level simulation of a complex electronic circuit takes on even more importance when considering the multiple iterations of a typical design process. The design verification in early stages of a design often identifies changes that must be made to the circuit design, requiring a modified circuit design which must then be reverified. Thus, the design process may require multiple full gate level simulations.

Existing methods exist for co-simulating mixed levels of abstraction for a circuit. These methods allow for timing gate simulations to be mixed with other simpler model abstractions (RTL, C etc.) These methods are deficient in that they do not specify a method that allows timing to be accurate across the boundary between the different abstractions of the circuit.

Thus, for at least the aforementioned reason, there exists a need in the art for a system for performing gate level simulations of a circuit design in a fast, efficient and effective manner, even when IP cores are used.

BRIEF SUMMARY OF THE INVENTION

The present invention is related to simulation of circuit designs, and more particularly to partial gate level simulations of a circuit design.

Various apparatuses, methods and systems for creating an integrated circuit and performing a gate level simulation of a circuit are disclosed herein. For example, some embodiments of the present invention provide a system for performing a gate level simulation of a circuit including a computer system, a design verification tool and an output device. The design verification tool, executable on the computer system, includes a simulator and a partial timing model generator. The partial timing model generator is operable to generate a representation of the circuit for simulation by cutting a first portion of a circuit out of a full gate level netlist for the circuit and leaving a second portion of the circuit represented by the full gate level netlist and corresponding timing, and to overlay a simplified representation of the first portion of the circuit over the representation of the circuit. The boundary between the first and second portions is formed by cutting the circuit at boundaries of timing paths, preserving timing paths for timing checks of interest in the second portion. The simulator is operable to perform a gate level simulation of the circuit based on the representation of the circuit. The output device is connected to the computer system and is operable to provide an indication of a result of the gate level simulation of the circuit.

In other instances of the aforementioned system, the partial timing model generator is adapted to identify the second portion of the circuit at least in part by identifying the interface logic of the circuit.

Other embodiments of the present invention provide methods for creating an integrated circuit, including providing a circuit description with a partial timing model for a circuit, wherein at least one timing arc in the circuit is represented in the circuit description without full timing information and a remainder of the circuit is represented with a gate level netlist with timing information. The circuit is cut on at least one timing path boundary and the portion of the circuit containing the at least one timing arc is removed and a simplified description without full timing information is overlaid over the portion that is cut out. A gate level simulation is performed based on the circuit description to verify a design of the integrated circuit, and the integrated circuit is fabricated.

Yet other embodiments of the present invention provide apparatuses for performing a gate level simulation of an electronic circuit, the apparatus having at least one computer readable medium with computer readable program code stored thereon. The computer readable program code includes code for generating a partial timing model for the electronic circuit by cutting a portion of a gate level netlist with timing information out of a description of the electronic circuit and overlaying a simplified description of the portion on the description of the electronic circuit, wherein the portion is cut out on at least one timing path boundary, with at least one timing arc represented without timing information in the partial timing model and with a remainder of the electronic circuit represented with a gate level netlist with timing information in the partial timing model. The computer readable program code also includes code for performing a partial gate level simulation based on the partial timing model, and code for providing an indication of a result of the partial gate level simulation to a user.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals may be used throughout several drawings to refer to similar components.

DETAILED DESCRIPTION OF THE INVENTION

The drawings and description, in general, disclose various embodiments of a method, system and apparatus for verifying the design of an electronic circuit by performing a partial gate level simulation. The partial gate level simulation simulates a selected portion of the electronic circuit, relying on previous verification of other portions of the electronic circuit and thereby greatly reducing the time and resources required for the simulation. Thus, repetition of a full gate simulation may be avoided for portions of the circuit which do not change between design cycles or which are not critical to portions of the circuit being analyzed in detail. The portion of the electronic circuit for which a gate level simulation is performed may be selected in any suitable manner, such as by using automated EDA tools, or by manual selection using a software user interface (graphical or text-based), or by a combination thereof, etc. The portion for which gate level simulation is performed contains complete timing paths for timing checks of interest. In one particular embodiment, the interface logic related to timing paths that originate and/or terminate outside the circuit is included in the gate level portion while core logic is abstracted and thus omitted from the gate level portion. In this embodiment, EDA tools for generating an interface logic model (ILM) of a circuit may be used to identify the interface logic, which may then be included in a gate level netlist with timing information to be processed in a gate level simulation, with the remainder of the circuit abstracted at some level so that it is omitted from the gate level simulation. This allows a designer to perform a partial gate level simulation, verifying the functionality and timing of a portion of a circuit limited to specific timing checks related to paths that cross the interface boundary into the module, rather than either performing a full gate level simulation of the full circuit or completely skipping the gate level simulation. The former option of a full gate level simulation can require an undesirably large amount of resources and time and can be repetitive and wasteful, particularly for a large and complex integrated circuit, ASIC or FPGA with multiple design cycles. The latter option of completely skipping the gate level simulation can leave functional or timing issues overlooked. Module boundaries are areas where these issues can often occur since each side of the boundary may be designed by different engineers. By focusing the partial gate level simulation on areas of interest in the circuit, such as the interfaces between any submodule and a higher level of the circuit, the run time and required resources can be greatly reduced without sacrificing the overall simulation accuracy. Some of the terms used herein will now be defined before continuing with a description of partial gate level simulations.

The phrase "partial gate level simulation" is used herein to refer to a gate level simulation of an electronic circuit using a circuit description with a partial timing model, in which a portion of the circuit description is a full gate level netlist with at least some timing information, and another portion of the circuit description is a simplified description at a different level of abstraction than the full gate level netlist. The partial timing model generator specifically selects the first portion such that any timing paths necessary for desired timing checks are included in the first portion. Thus the partial timing model includes a reduced or eliminated amount of timing information for a simplified portion of the circuit, and maintains the timing information for the part of the circuit to be verified in a gate level simulation.

The term "abstraction" is used herein to refer to the action of using a description of portions of a circuit to be simplified at a higher abstraction level than the description of portions of the circuit to be included in a gate level simulation. Thus, during the gate level simulation of the circuit, the simplified portions of the circuit are excluded from the gate level simulation or are processed in an abbreviated, simplified fashion. An abstracted circuit description may use a gate level netlist without timing information, a register transfer level (RTL) description, a bus functional model (BFM), a hardware description language (HDL) representation of the circuit, or a C language model of the circuit, or any type of circuit description that is processed in any abbreviated form during a gate level simulation, such that the resources and effort required to perform a gate level simulation of an abstracted portion of a circuit are less than that required to perform a full gate level simulation of the circuit based on a full timing model in a full gate netlist with timing information.

Circuit/Block/IP core/Module/Submodule: A piece of circuit design with inputs and outputs, valid for ASICs, FPGAs, or any other target, regardless of size or complexity, process type etc.

Interface Logic Model (ILM): A timing model that may be generated by the Synopsys® PrimeTime® tool. From a functional point of view, this tool takes as input the gate-level netlist for a block and generates a flattened Verilog® netlist that contains only the interface logic related to timing paths that originate and/or terminate outside the circuit, without the internal register-to-register logic. From a timing point of view, it takes in a standard delay format (SDF) input and extracts only timing paths that cross a module boundary (through its ports). These paths either terminate or originate at registers inside the module.

Timing Paths: Timing paths are paths from a reference point used to calculate timing checks in a circuit (or part of the surrounding circuit in the case of paths that propagate from a circuits inputs to outputs). At least two paths are used for a timing check. Examples of such paths for register logic originate at a clock reference point, with one path propagating to the data input and a corresponding path propagating from a clock reference point to a clock input.

Cone of logic: The set of elements encountered during a back trace from an internal circuit node, called an apex, to primary input ports of a module etc. (For the partial timing model cones of logic are further defined where the back trace stops at outputs of a flop/latches as well as primary input ports of a module.)

"Omitting" a block from a gate level analysis can mean that it is not included or processed at all during the gate level simulation, or results from a previous gate level simulation of the block can be referenced and linked during the gate level simulation, or the block can be processed in any abbreviated form during the gate level simulation, such that the resources and effort required to perform the partial gate level simulation of the circuit based on the partial timing model are less than that required to perform a full gate level simulation of the circuit based on a full timing model in a full gate netlist with timing information.

Figure 1:
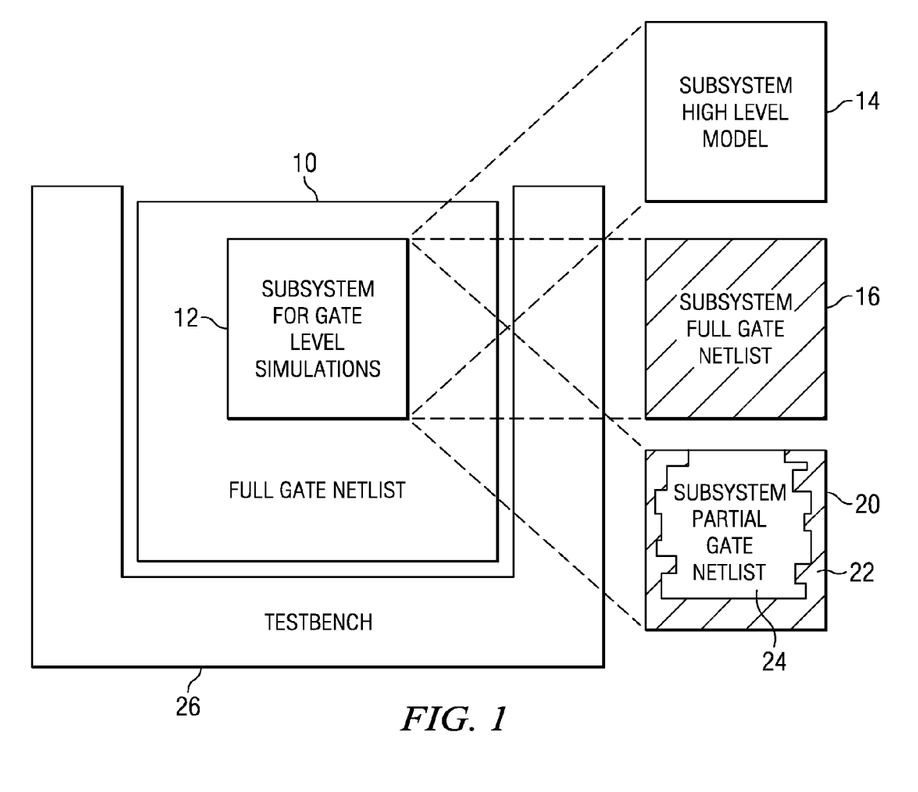
FIG. 1 depicts a system for performing a partial gate level simulation of a circuit design in accordance with some embodiments of the present invention.

Referring now to FIG. 1, a system for performing a partial gate level simulation of a circuit design in accordance with some embodiments of the present invention will be described. When designing a complex electronic circuit, often a module 10 includes one or more submodules (e.g., 12). This allows the circuit to be designed in pieces, with smaller submodules 12 being designed and verified (or obtained from a third party) and integrated into a larger module 10. In conventional circuit verification processes, the circuit design of the submodule 12 may be completely omitted from a gate level analysis by providing a circuit description 14 for the submodule 12 using a high level model, such as a C language description that does not include complete timing information. Thus, when the gate level analysis is run on the module 10 based on the full gate netlist of the module 10, the gate level analysis of the submodule 12 is not possible due to a lack of information and is therefore skipped, speeding up the verification process at the risk of missing any faults in the submodule 12. Alternatively, a full gate level analysis of the module 10 and submodule 12 combined may be performed by including a full gate netlist 16 of the submodule 12. However, if the design of the submodule 12 has previously been included in a full gate level simulation, any subsequent full gate level simulation of the unchanged submodule 12 is wasteful of resources and time. By providing a partial gate netlist or partial timing model 20 for the submodule 12, including a full gate netlist 22 for portions of the submodule 12 and a simplified description 24 for other portions of the submodule 12, the partial gate level simulation of the module 10 and submodule 12 is much faster and less wasteful. The partial gate level simulation may also prevent skipping of full gate level verification of any part of the design, because the designer can ensure that each part of the circuit design is verified at least once with a full gate level simulation without repeating the full gate level simulation in subsequent design cycles. The use of a partial timing model 20 also allows portions of the submodule 12 to be targeted during verification to quickly narrow in on potential problem areas of the circuit design. The partial gate level simulation may be run using any suitable testbench 26 for providing input, test procedures, expected output, etc.

Figure 2:
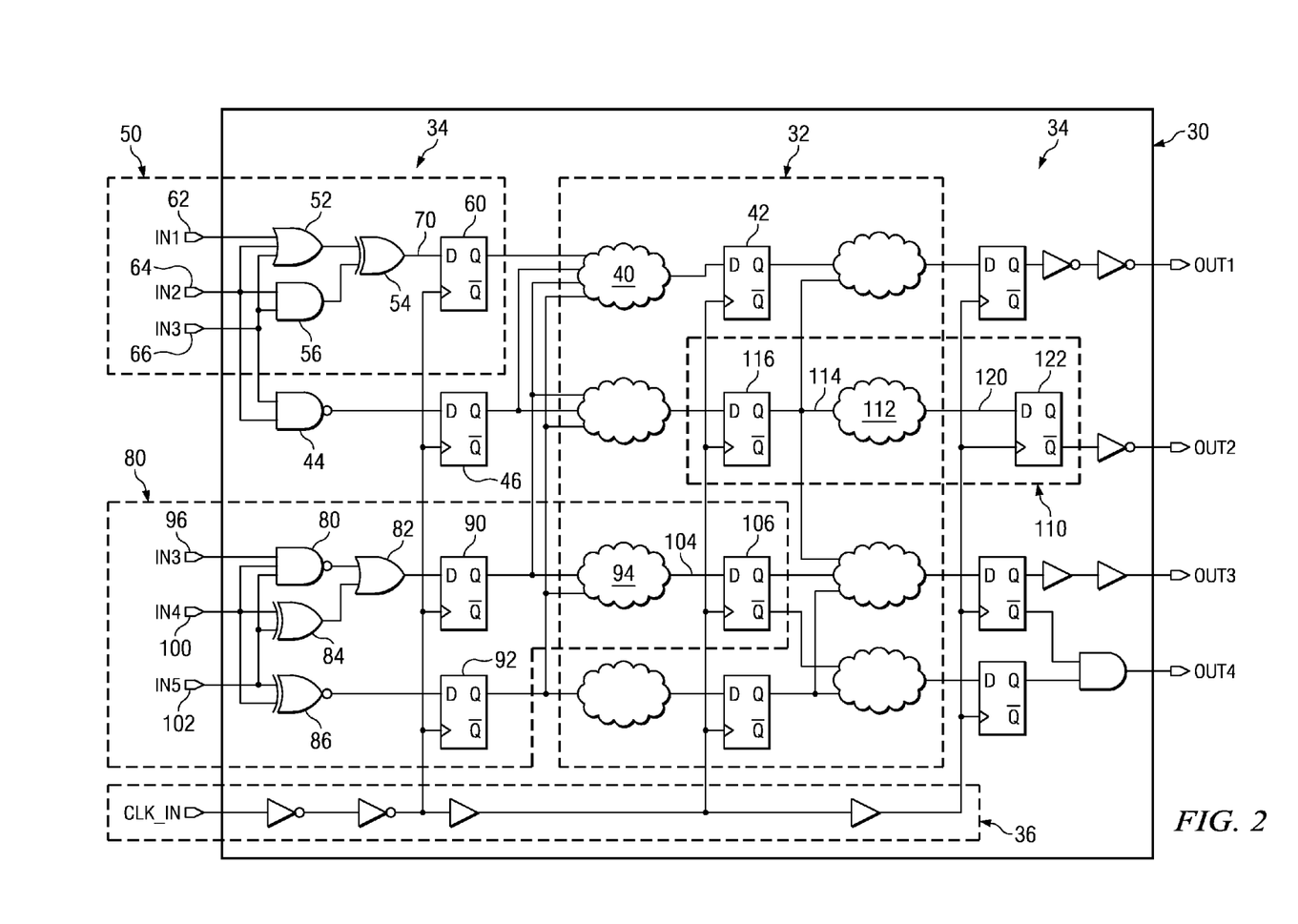
FIG. 2 depicts a block diagram of a circuit design illustrating various different combinations of abstraction levels in a circuit design for partial gate level simulations in accordance with some embodiments of the present invention.

Referring now to FIG. 2, various different combinations of abstraction levels in a partial timing model for a circuit design 30 in accordance with some embodiments of the present invention will be described, as they may be used for partial gate level simulations of the circuit design 30. In one particular embodiment, a simplified description is provided for core logic 32 with a remainder of the circuit design 30 being described by a full gate level netlist. The partial timing model of this particular embodiment may be based on an ILM model of the circuit design 30. The partial timing model includes the interface logic 34 and the clock paths 36 necessary for timing checks at apex's of cones of logic from the input pins, and for paths that are parts of cones of logic to timing checks outside the core 30 of which the output pins are part. Using this partial timing model in a partial gate level simulation will perform a full gate level simulation of the interface logic 34 and the clock paths 36 and an abbreviated or nonexistent simulation of the core logic 32. Note that the core logic 32 is not limited to any particular type of circuitry, and may include for example logic gates (e.g., 40), flip flops (e.g., 42) or any other type of synchronous or asynchronous, passive or active circuitry. Similarly, the interface logic 34 and the clock paths 36 may include any type of synchronous or asynchronous, passive or active circuitry, including logic gates (e.g., 44) and flip flops (e.g., 46).

In another particular embodiment, timing checks for logic included in region 50 may be of interest. Cone of logic 50 may be targeted and included in the full gate netlist, along with the clock paths 36. The cone of logic 50 includes logic gates 52, 54 and 56 and extends from input ports IN1 62, IN2 64 and IN3 66 to the input of flip flop 60. Including just the cone of logic 50 in the full gate netlist and a simplified description of the remainder of the circuit design 30, the partial gate level simulation can quickly focus on the timing and functionality of the cone of logic 50 or the interaction between the cone of logic 50 and associated outputs from an upper level module in which the circuit design 30 is connected.

In yet another particular embodiment, an internal cone of logic 80 may be targeted and included in the full gate netlist with all logic and timing information for paths necessary for timing checks in 80, including the clock paths 36. The internal cone of logic 80 includes logic gates 80, 82, 84 and 86, flip flops 90 and 92 and logic gates 94, and extends from input ports IN3 96, IN4 100 and IN5 102 to the input 104 of flip flop 106. Basing the partial timing model on a full gate netlist of the internal cone of logic 80 and clock paths 36 and a simplified description of the remainder of the circuit design 30, the partial gate level simulation can target a portion of the interface logic and a portion of the core logic.

In yet another particular embodiment, timing checks on internal timing paths in 110 may be targeted. All timing paths necessary for those timing checks are included in the full gate netlist including the clock paths 36. The internal timing paths in 110 include logic gates 112 and extends from the output 114 of an internal flip flop 116 to the input 120 of another flip flop 122. (Note that although the line identifying the internal timing check in 110 in FIG. 2 encompasses flip flops 116 and 122, the timing path extends just between the output 114 of internal flip flop 116 and the input 120 of flip flop 122.) Thus, any timing paths, cones of logic or any other desired portion of a circuit may be included in a partial timing model for full gate level simulation to cover any identified timing checks in the simulation, with the remainder of the circuit abstracted and represented by a simplified description to reduce the resources and time required to run the gate level simulation.

The partial gate level simulations disclosed herein are applicable in any suitable design process, including in IP cores and in modular designs created by a single design entity where submodule or modules are first designed and verified, including gate level simulation, then combined in a larger circuit. Partial gate level simulation is also beneficial to mixed-signal simulations, such as gate level simulations of circuits containing both analog and digital sections, allowing the analog and digital sections to be independently designed and verified. Once the analog and digital sections have been combined, a partial gate level simulation may be performed on the overall circuit, verifying the interfaces between the analog and digital sections. Partial timing models of circuits, enabling partial gate level simulations, also facilitate modular design by division of design teams and by the use of IP cores from external suppliers, as well as facilitating the protection of circuit designs by suppliers of IP cores. Partial timing models provide an accurate and high-performance method to allow hierarchical full-timed gate simulations to be performed, allowing the design and verification of a complex circuit to be broken into manageable hierarchical pieces. Partial timing models also provide visibility of interface logic and associated timing paths of IP cores from external suppliers or to modules from other design teams, enabling examination and validation of both function and timing for a module. Partial timing models may also be used to reveal just relevant circuitry to help an end user debug a specific issue. Partial timing models may also be used to hide proprietary implementation details by encrypting the rest of the design, the contents of the simplified or abstracted description, using a market available encryption EDA tool such as the Synopsys® VMC model.

Figure 3:
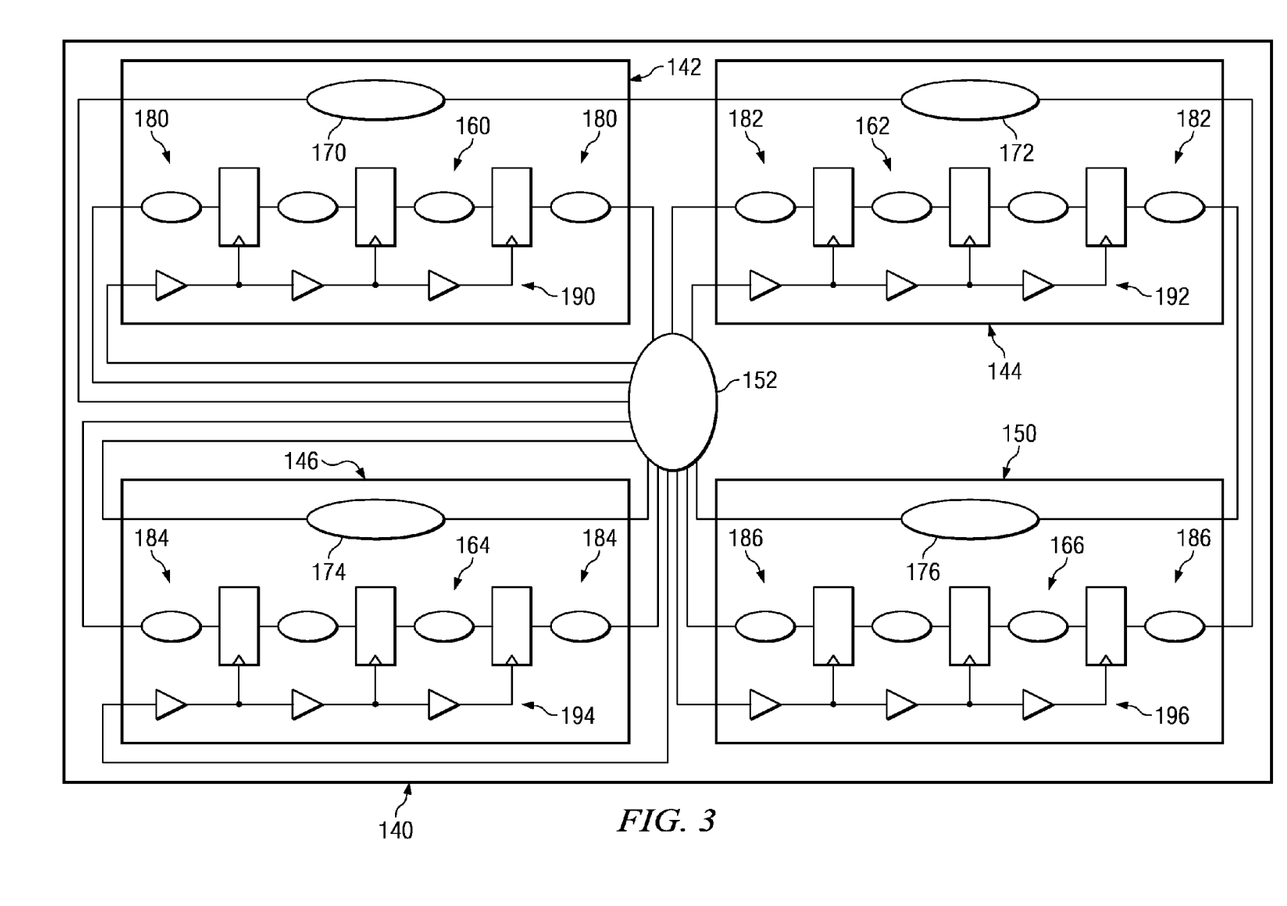
FIG. 3 depicts a block diagram of a netlist for a circuit design before abstraction for partial gate level simulations in accordance with some embodiments of the present invention.
Figure 4:
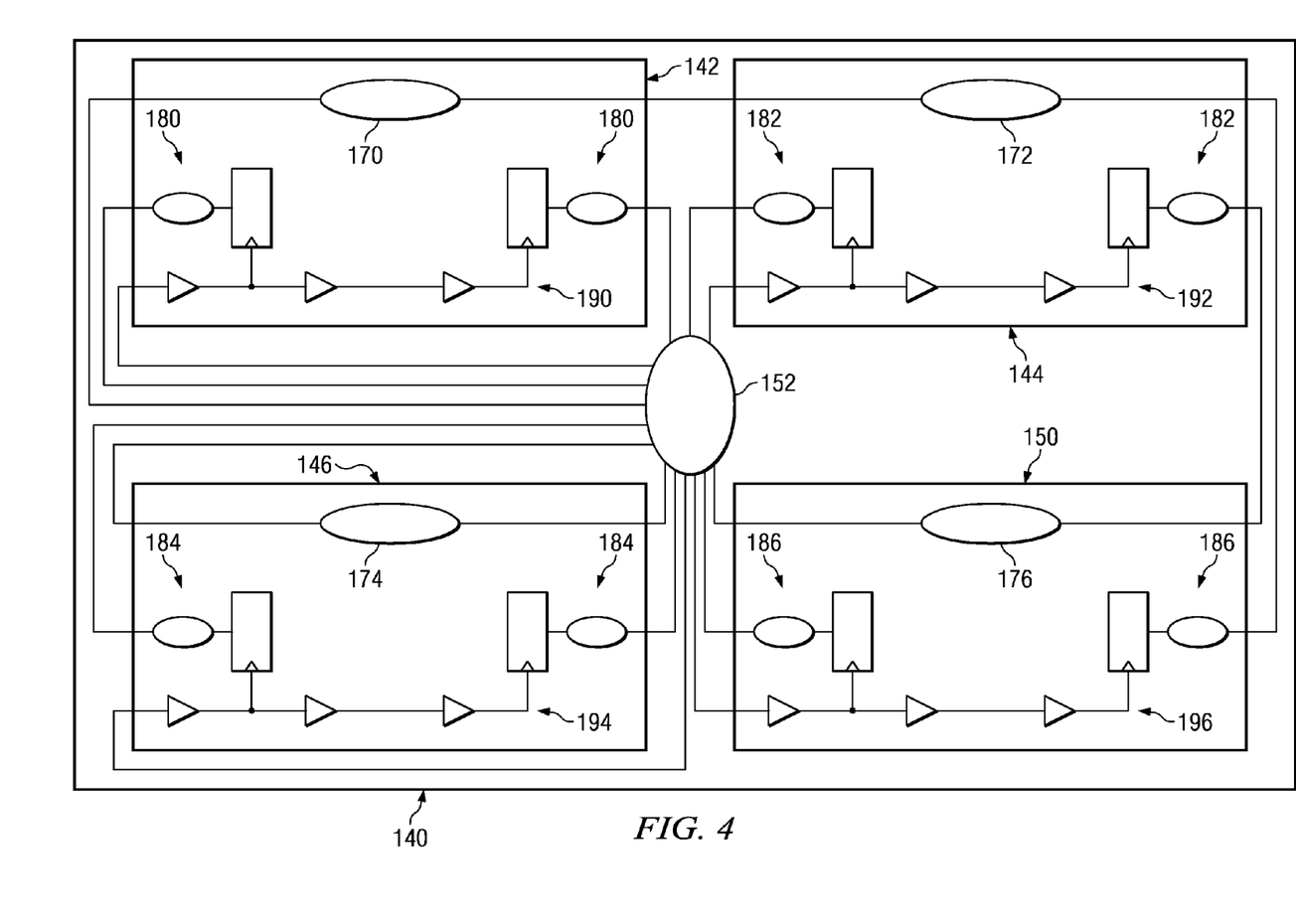
FIG. 4 depicts a block diagram of a netlist for a circuit design after abstraction for partial gate level simulations in accordance with some embodiments of the present invention.

Referring now to FIGS. 3 and 4, block diagrams of netlists for a circuit design before and after abstraction in accordance with some embodiments of the present invention will be described. FIGS. 3 and 4 illustrate a system on a chip (SOC) 140 having multiple modules 142, 144, 146 and 150. For example, modules such as a processor or DSP cores, memory blocks, clock sources, external interfaces, power regulation blocks, etc may be included in the SOC 140, connected by top-level logic or circuitry 152, such as clock and reset generation circuitry. The modules 142, 144, 146 and 150 may be designed in modular or hierarchical fashion by various design teams or may comprise IP cores from an external supplier, etc. The design of the modules 142, 144, 146 and 150 may be verified using a full gate level simulation by the designers before inclusion in the SOC 140. Thus, full gate level simulation of the SOC 140 including the entire internal circuitry 160, 162, 164 and 166 of the modules 142, 144, 146 and 150 is redundant and unnecessary. Partial timing models for the modules 142, 144, 146 and 150 may be provided, omitting the internal circuitry with flip flops 160, 162, 164 and 166 and leaving internal logic paths without flip flops 170, 172, 174 and 176, interface logic 180, 182, 184 and 186 and clock paths 190, 192, 194 and 196. Partial gate level simulation can be particularly beneficial for SOC 140 design, because the interface logic between modules 142, 144, 146 and 150 can have much less traffic during a gate level simulation than the internal logic inside the modules 142, 144, 146 and 150. For example, if the modules 142, 144, 146 and 150 are processor cores, the top level of the SOC 140 may primarily supply proper reset and clock signals and load a test image to the processor cores in the modules 142, 144, 146 and 150, with the processor cores then running the test image from internal memory. During top gate level simulation of the SOC 140, the interface logic handling the reset and clock signals and loading of a test image and reading of results can be tested much more quickly if the full gate level simulation of the processor cores in the modules 142, 144, 146 and 150 is not repeated each time. This method allows for accurate timing analysis for all timing checks involving the input and output timing paths of the modules 142, 144, 146 and 150 that would not be available with current methods, or forgoing simulations altogether.

Although similar in some respects to a static timing analysis (STA), partial gate level simulation of a circuit differs from a static timing analysis in several important respects. An STA is a static mathematical analysis of the timing of a circuit. For example, given a circuit with two events such as a clock and data transition, a static timing analysis calculates statically when the transition on the clock and data signals will arrive at a certain point to identify possible timing problems. In contrast, a gate level simulation tests both the timing and functional operation of the circuit, driving a test pattern through the circuit. The gate level simulation reads timing information from an input such as an SDF file, determining what delay to add to a signal as it passes through each gate and wire, and performing much the same calculations as a static timing analysis. However, the gate level simulation works well for asynchronous as well as synchronous stimuli, unlike an STA. A gate level simulation is also better at verifying circuits with multi-cycle paths, which may be difficult to define correctly for STA, using the functional tests to check the states during and after multiple cycles through the multi-cycle paths. The gate level simulation thus verifies both the functional and timing performance, testing for the correct outputs based on input values. The output of the gate level simulation can also provide full timing information, showing the full setup and hold performance of the circuit, etc.

In one particular embodiment as discussed above, the partial timing model may be generated based on the output of a Synopsys® PrimeTime® tool. A full gate level netlist and timing information, such as in an SDF or Standard Parasitic Extraction Format (SPEF) format file, is provided to the ILM model generator. The ILM model generator generates a flattened Verilog® netlist containing an ILM model Verilog® file and an SDF or SPEF file that contains only the interface timing, including for example the circuitry from the inputs to the first flip flops and from the last flip flops to the outputs, clock information, the entire timing path of paths not passing through flip flops, any internal register outputs if needed for an interface timing check, and additional information if there is more than one clock associated with a module, or any combination of these items. The instance names in the partial timing model as generated by the ILM model generator may be the same as those in the original full netlist, except that if the design is hierarchical, the hierarchy may be flattened and the hierarchical path identification may be included in the instance name.

Figure 5:
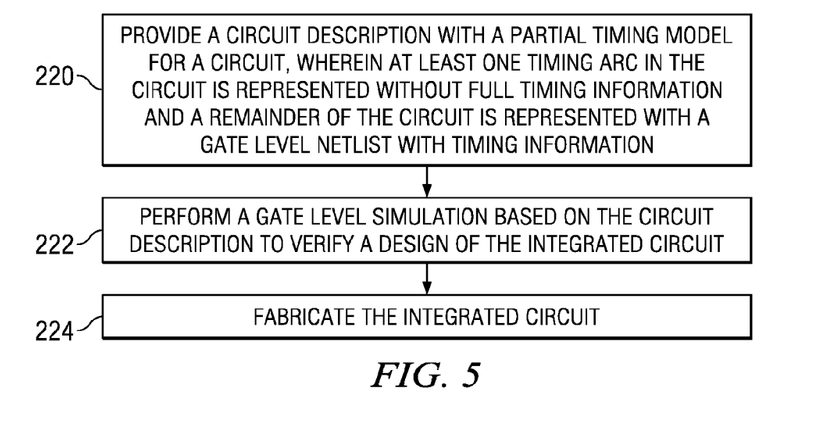
FIG. 5 is a flow chart of an operation for performing a partial gate level simulation in accordance with some embodiments of the present invention.

A method for creating an integrated circuit according to some embodiments of the present invention, including a partial gate level simulation, is summarized in the flow chart of FIG. 5. A circuit description is provided with a partial timing model for a circuit, wherein at least one timing arc in the circuit is represented in the circuit without full timing information and a remainder of the circuit is represented with a gate level netlist with timing information. (Block 220) A portion of the circuit containing the at least one timing arc is cut out on a boundary of at least one timing path and a simplified description without full timing information is overlaid over the portion that is cut out. A partial gate level simulation is performed based on the circuit description to verify a design of the integrated circuit. (Block 222) The integrated circuit, once verified, is fabricated in any suitable manner. (Block 224) For example, an ASIC may be fabricated, or an FPGA may be provided with an associated memory containing an image of the circuit, etc. Note that in the portion of the circuit for which a full gate level netlist with timing information is retained, in some particular embodiments complete timing paths are maintained for all gates and timing in the desired timing check. In other particular embodiments, some complete paths in the portion of the circuit for which a full gate level netlist with timing information is retained may be disabled (e.g., tied to a static value) or removed depending on the goals of the simulation. For example, it may be desirable to remove or disable reset paths, manufacturing test logic paths, etc.

When identifying a first portion of a circuit to be simulated using a gate level netlist with timing information before cutting out a second portion of the circuit and overlaying a simplified description without full timing information, the first portion is specifically selected such that any timing paths necessary for desired timing checks are included in the first portion. In one particular embodiment, the logic function of the first portion may overlap (be redundant) with the logic function of the simpler level of abstraction in the second portion. The partial timing model includes connections necessary between the first portion and the simpler second portion. Elements in the simpler second portion may need to be mapped back to the first portion of the circuit. This mapping may be accomplished by hand or may be based on the output of existing EDA tools which can map points in the gate netlist to points in an RTL or other simplified model. In one example of using partial timing modeling for gate level simulation, an RTL model is used to provide the overlapping logic function between the original and abstracted portions of the circuit. The interface timing checks identified by an ILM model are targeted and the remaining portions of the circuit are cut out of the gate level netlist and overlaid with an abstracted description. An RTL model of the abstracted portion is also generated, and the interface gates and timing are instantiated in parallel with the RTL model of the circuit. Note that one or both the gate level netlist and RTL model may need to be renamed to include both in the simulation. The gates may be instantiated under the RTL or vice versa, or a wrapper may be used that instantiates both in parallel. Once the instantiations are made, the simulation is run as normal for a full gate simulation. Instead of building the entire circuit with full timed gates, only the ILM portion is constructed of full timed gates. The RTL portion calculates missing values for the ILM in such a way that the full timing paths are present. The gate portion contains the timing checks necessary and performs these during simulation as normal, resulting in very accurate timing for the timing checks of interest. In one particular embodiment, when instantiating the inputs, the circuit inputs connect in parallel to the gate level model and the RTL model. The inputs to the partial model may need to be modified to tie off static values for any inputs that were not included in the ILM model. For both inputs and outputs, some of the fan-in cone will come from internal registers which will need to be mapped from the RTL model to the abstracted portion. Thus, all the inputs into the cone will need to be connected to values generated in the RTL model or from connections in common with any input logic. Some care may need to be taken care to make sure that the timing of the RTL input to a flip-flop meets the timing needed by the flip-flop. (The RTL is often clocked by ideal clocks, and this will need to be adjusted to not violate the flip-flop in question. This is not difficult since the RTL can work virtually instantaneously.) When establishing register connections from the simplified model for both inputs and outputs, in order to meet the requirement that these form complete timing paths, it is likely that these will be connected to the D inputs of the registers that drive into the cone of logic. The RTL calculates the D inputs as normal. There may need to be inversion to match the expectation of the register, because transforms from RTL to gates can sometimes invert the registers. In this manner, the outputs of the flip-flop drive the correct value (from the D input) with the correct timing, which is the path from the clock reference point to the clock pin on the flip-flop, through the clock to Q delay of the flip-flop, on through any logic to either a register connected to input ports and/or the output port of the circuit. This flip-flop, clock and any other logic and timing paths are present in the ILM model. With an encrypted simplified model these connections are made visible in the encryption, and connected as described above. With a C or BFM model, these connections for the output registers may need to be constructed on a case by case basis (including forcing to a known but static value if not a concern.) This should not be an issue since most registers need to be accounted for in any abstraction in some fashion.

Figure 6:
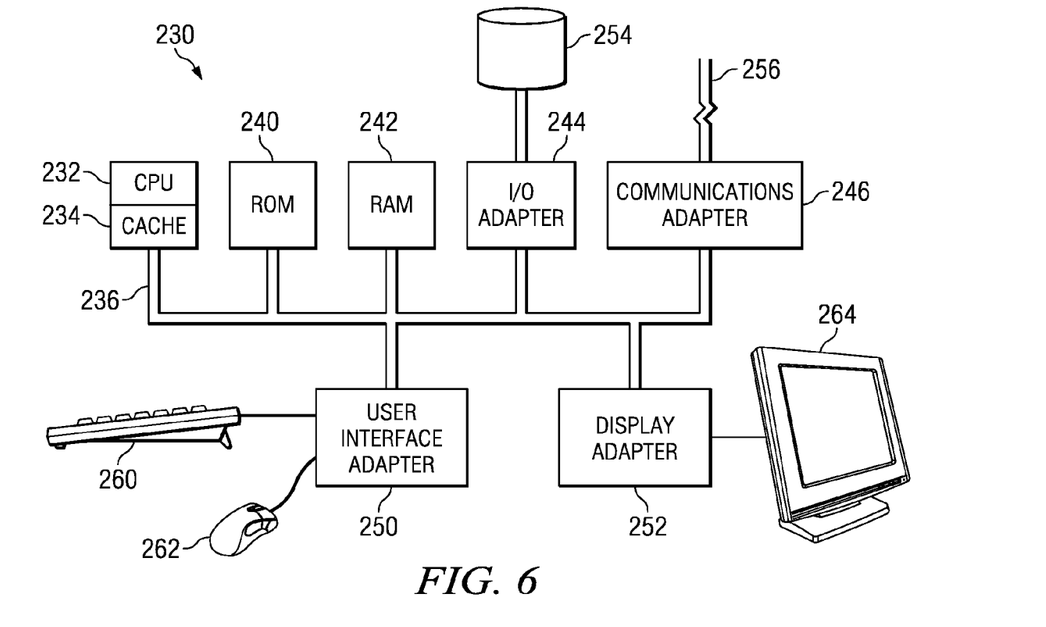
FIG. 6 depicts a block diagram of an exemplary computer system that may be used to perform a partial gate level simulation of a circuit design.

A typical computer system in which the system, method and apparatus for verifying the design of an electronic circuit by performing a partial gate level simulation is illustrated in the block diagram of FIG. 6. A computer system 230 generally includes one or more central processing units (CPUs) 232 with a cache 234, connected by a system bus 236 to devices such as a read-only memory (ROM) 240, a random access memory (RAM) 242, an input/output (I/O) adapter 244, a communications adapter 246, a user interface adapter 250, and a display adapter 252. Data storage devices such as a hard drive 254 are connected to the computer system 230 through the I/O adapter 244. In operation, the CPU 232 in the computer system 230 executes instructions stored in binary format on the ROM 240, on the hard drive 254, in the RAM 242, and in the cache 234, causing it to manipulate data stored in the RAM 242 and the cache 234 to perform useful functions such as executing EDA software and running circuit verification tools to perform a partial gate level simulation as disclosed herein. The computer system 230 may communicate with other electronic devices through local or wide area networks (e.g., 256) connected to the communications adapter 246. User input is obtained through input devices such as a keyboard 260 and a pointing device 262 which are connected to the computer system 230 through the user interface adapter 250. Output is displayed on a display device such as a display device 264 connected to the display adapter 252. Results of the partial gate level simulations may be displayed on the display device 264, including for example a listing and details of errors that were found, such as an identification of the timing paths or logic cones involved in an error, the functional states that result in the error, the timing details of the error, etc. Displayed results may also include a listing of what portions of the circuit passed the gate level simulation, or what portions have questionable or marginally unsatisfactory results, etc. Displayed results may also include a full listing of the states of selected nodes at various times to be evaluated externally rather than an indication of error or success.

Various computer readable or executable code or electronically executable instructions have been referred to herein. These may be implemented in any suitable manner, such as software, firmware, hard-wired electronic circuits, or as the programming in a gate array, etc. Software may be programmed in any programming language, such as machine language, assembly language, or high-level languages such as C or C++. The computer programs may be interpreted or compiled.

Computer readable or executable code or electronically executable instructions may be tangibly embodied on any computer-readable storage medium or in any electronic circuitry for use by or in connection with any instruction-executing device, such as a general purpose processor, software emulator, application-specific circuit, a circuit made of logic gates, etc. that can access or embody, and execute, the code or instructions.

Methods described and claimed herein may be performed by the execution of computer readable or executable code or electronically executable instructions, tangibly embodied on any computer-readable storage medium or in any electronic circuitry as described above.

A storage medium for tangibly embodying computer readable or executable code or electronically executable instructions includes any means that can store the code or instructions for use by or in connection with the instruction-executing device. For example, the storage medium may include (but is not limited to) any electronic, magnetic, optical, or other storage device. The storage medium may even comprise an electronic circuit, with the code or instructions represented by the design of the electronic circuit. Specific examples include magnetic or optical disks, both fixed and removable, semiconductor memory devices such as memory cards and read-only memories (ROMs), including programmable and erasable ROMs, non-volatile memories (NVMs), etc. Storage media for tangibly embodying code or instructions also include printed media such as computer printouts on paper which may be optically scanned to retrieve the code or instructions, which may in turn be parsed, compiled, assembled, stored and executed by an instruction-executing device.

In conclusion, the present invention provides novel systems, devices, methods and arrangements for partial gate level simulations of a circuit design. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A system for performing a gate level simulation of a circuit, the system comprising:
a computer system;
a design verification tool executable on the computer system, the design verification tool comprising a simulator and a partial timing model generator, the partial timing model generator being operable to generate a representation of the circuit for simulation by cutting a first portion of a circuit out of a full gate level netlist for the circuit leaving a second portion of the circuit represented by the full gate level netlist and annotated timing and to overlay a simplified representation of the first portion of the circuit over the representation of the circuit, wherein the circuit is cut at boundaries of timing paths, the simulator being operable to perform a gate level simulation of the circuit based on the generated representation of the circuit; and
an output device connected to the computer system being operable to provide an indication of a result of the gate level simulation of the circuit.

2. The system of claim 1, wherein the simplified representation comprises a gate level netlist without timing information.

3. The system of claim 1, wherein the simplified representation comprises a circuit description having a higher level of abstraction than a full gate level netlist.

4. The system of claim 1, wherein the partial timing model generator is adapted to identify the second portion of the circuit at least in part by identifying an interface logic of the circuit.

5. The system of claim 1, wherein the partial timing model generator is adapted to receive an indication of at least one timing check within the circuit to be included in the second portion of the circuit.

6. The system of claim 1, wherein the partial timing model generator is adapted to identify the second portion of the circuit at least in part by identifying and including clock paths through the circuit.

7. The system of claim 1, wherein the first portion and the second portion of the circuit overlap in the generated representation of the circuit.

8. A method for creating an integrated circuit, the method comprising:
providing a circuit description with a partial timing model for a circuit, wherein at least one timing arc in the circuit is represented in the circuit description without full timing information and a remainder of the circuit is represented with a gate level netlist with timing information, and wherein a portion of the circuit containing the at least one timing arc is cut out on at least one timing path boundary and a simplified description without full timing information is overlaid over the portion that is cut out;
performing a gate level simulation based on the circuit description to verify a design of the integrated circuit; and
fabricating the integrated circuit.

9. The method of claim 8, wherein the gate level simulation simulates the timing and logical function of the at least one timing arc in the circuit.

10. The method of claim 8, wherein the circuit description with a partial timing model comprises a submodule in the integrated circuit, and wherein the gate level simulation verifies an interaction between the at least one timing arc in the submodule and a surrounding circuit design in the integrated circuit.

11. The method of claim 8, wherein a previous full gate level simulation of at least said remainder of the circuit is performed before performing the gate level simulation based on said circuit description.

12. The method of claim 8, said providing comprising selecting the at least one timing arc in the circuit to represent without full timing information.

13. The method of claim 12, said selecting comprising generating an interface logic model of the circuit description and including timing arcs in the interface logic model as the at least one timing arc.

14. The method of claim 12, said selecting comprising obtaining an identification of the at least one timing arc as a user input.

15. The method of claim 12, said selecting comprising obtaining an identification of contents of at least one cone of logic in the circuit.

16. The method of claim 12, wherein clock paths in the circuit are represented in the gate level netlist with timing information.

17. The method of claim 8, said providing comprising including a gate level netlist without timing information in the circuit description for the at least one timing arc.

18. The method of claim 8, said providing comprising including a representation in the circuit description of the at least one timing arc using a higher level of abstraction than a level of abstraction in the gate level netlist with timing information.

19. The method of claim 8, further comprising encrypting a portion of the circuit description containing the at least one timing arc.

20. An apparatus for performing a gate level simulation of an electronic circuit, the apparatus comprising:
   a. at least one computer readable medium; and
   b. a non-transitory computer readable program code stored on said at least one computer readable medium, said computer readable program code comprising:
      i. code for generating a partial timing model for the electronic circuit by cutting a portion of a gate level netlist with timing information out of a description of the electronic circuit and overlaying a simplified description of the portion on the description of the electronic circuit, wherein the portion is cut out on at least one timing path boundary, wherein at least one timing arc is represented without timing information in the partial timing model and wherein a remainder of the electronic circuit is represented with a gate level netlist with timing information in the partial timing model;
      ii. code for performing a partial gate level simulation based on the partial timing model; and
      iii. code for providing an indication of a result of the partial gate level simulation to a user.

* * * * *